Figure 1:
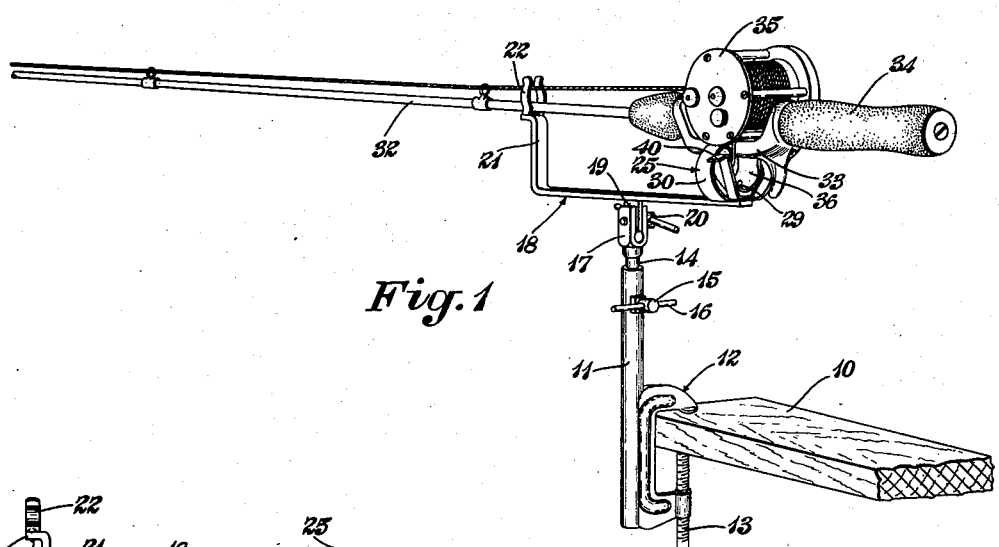

Sept. 12, 1950        S. CLIMO        2,522,255

FISHING ROD HOLDER

Filed June 18, 1949

INVENTOR.
*Samuel Climo*
BY

ATTORNEYS

Patented Sept. 12, 1950

2,522,255

UNITED STATES PATENT OFFICE 2,522,255

FISHING ROD HOLDER

Samuel Climo, Massillon, Ohio

Application June 18, 1949, Serial No. 99,977

4 Claims. (Cl. 248—42)

The invention relates to a holder for fishing rods or poles and more particularly to a device adapted to be clamped upon the seat of a boat, or the like, for supporting a fishing rod in any desired position of adjustment.

It is an object of the invention to provide such a holder for supporting a rod with means for adjusting the same vertically, for varying its inclination in a vertical plane and for providing a complete rotation in a horizontal plane, whereby the rod may be supported at any desired height above the seat of the boat and positioned angularly in any desired direction.

Another object is to provide a holder especially adapted for supporting a fishing rod of the type having an offset portion in the handle for accommodating the reel.

A further object is to provide a fishing rod holder comprising an upright tube with means for clamping the same to the seat of a boat or the like, a vertically and rotatably adjustable rod within the tube and a bracket pivotally connected to the upper end of the rod, upon a horizontal axis, whereby any desired adjustment may be easily and readily obtained.

A still further object is to provide a fishing rod holder of the character referred to in which the bracket has a spring clip at one end which receives and frictionally holds a substantially C-shaped clip, detachably connected to the offset portion of the handle of the rod, the other end of the bracket having an upright extension upon which is mounted a bifurcation for receiving and supporting the rod at a point spaced from the handle.

Figure 2:
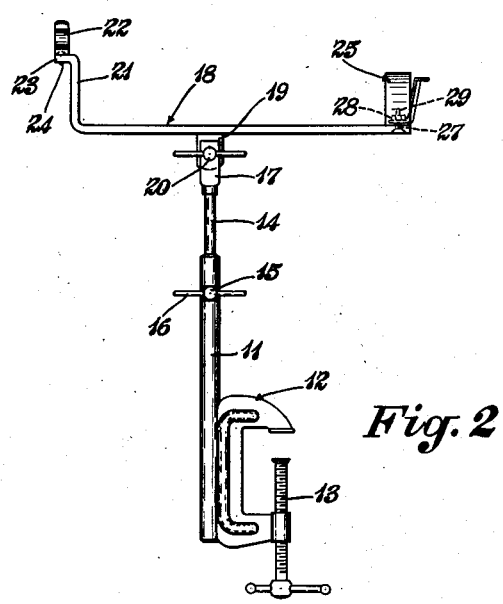
Figure 3:
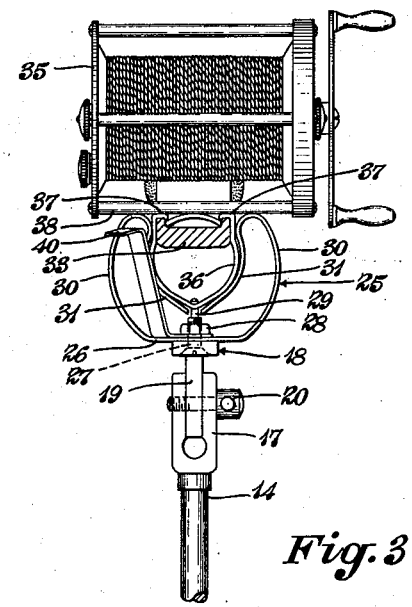
Figure 4:
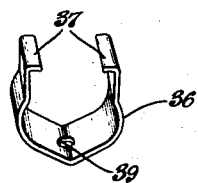

The above objects together with others which will be apparent from the drawing and following description, or which may be later referred to, may be attained by constructing the improved fishing rod holder in the manner hereinafter described in detail and illustrated in the accompanying drawing, in which:

Figure 1 is a perspective view of the improved fishing rod holder illustrating a fishing rod supported thereby;

Fig. 2 a side elevation of the fishing rod holder;

Fig. 3 an enlarged, sectional elevation showing the manner in which the clip upon the offset portion of the handle of the rod is frictionally received within the spring clip upon the bracket of the holder; and Fig. 4 a detached perspective view of the clip which is detachably connected to the offset portion of the handle of the rod.

Referring now in detail to the embodiment of the invention illustrated in the drawing, in which similar numerals refer to similar parts throughout, a portion of the seat of a boat is indicated at 10 in Fig. 1, to show the manner in which the fishing rod holder is supported thereon.

The holder includes the upright tube 11, to the lower portion of which is welded, or otherwise rigidly attached, a conventional C-clamp, indicated generally at 12 and provided with the usual clamping screw 13, by means of which the tube 11 may be clamped in upright position upon the seat 10 of a boat or similar support.

A rod 14 is telescopically and rotatably mounted within the tube 11 and a screw 15 is threaded radially through one side of the tube for contact with the rod 14 so as to hold the same clamped in any desired adjusted position within the tube. A cross bar 16 may be provided upon the head of the screw 15 so that the same may be quickly and easily manipulated without the use of tools. The upper end of the rod 14 is bifurcated as shown at 17.

A bracket, indicated generally at 18, is adjustably connected to the upper end of the rod. This bracket may be formed from a flat bar, as shown, and is provided, intermediate its ends, with a depending ear 19, received within the bifurcated upper end 17 of the rod, a hand screw 20 being provided for clamping the ear 19 in adjusted position within the bifurcation 17. It will be seen that the screw 20 provides a horizontal axis around which the bracket 18 may be adjusted to any desired angle.

One end of the flat rod forming the bracket is bent upwardly, providing the upright support 21, upon which is located a suitable bifurcation to receive and support a portion of the fishing rod at a point spaced from the handle thereof. This bifurcation may be in the form of a U-shaped clip 22 connected to the out-turned upper end 23 of the upright portion 21 of the bracket, as by a rivet or screw, indicated at 24.

At the other end of the bracket 18 is mounted a spring clip, indicated generally at 25, which may be formed from a single strip of spring material, the central flat portion 26 of which is secured to this end portion of the bracket as by the screw 27 and nut 28, the screw having a reduced, unthreaded upper end portion 29 the purpose of which will be later described.

Each end portion of the spring strip, forming the spring clip 25, is bent upwardly, as indicated at 30, and then downwardly and inwardly, as indicated at 31, as best shown in Fig. 3, the terminal ends being slightly spaced from each other on opposite sides of the reduced, unthreaded stud portion 29 of the screw 27.

The improved fishing rod holder is especially adapted for supporting the conventional type of fishing rod, such as indicated at 32, provided with the usual offset portion 33 on the handle 34 for accomodating and supporting a reel as indicated at 35.

For the purpose of detachably clamping the fishing rod upon the bracket of the holder, a substantially C-shaped clip 36 is detachably connected to the offset portion 33 of the handle of the rod in the manner best shown in Fig. 3, the inturned flanges 37, at the upper end of said clip, being engaged over opposite edges of the offset portion 33 of the handle, while one of the tie rods 38 of the reel engages over the top of said flanges and holds the clip 36 rigidly in position upon the offset portion 33 when the reel is clamped thereto as in usual and ordinary practice.

The C-shaped clip 36 is adapted to be received between the curved terminal ends 31 of the spring clip 25, as best shown in Fig. 3, frictionally holding the handle portion of the rod in engagement with the bracket.

An aperture 39 is provided in the lower end of the C-shaped clip 36 to receive the reduced, unthreaded stud portion 29 of the screw 27 when the C-shaped clip 36 is inserted into the spring clip 25 as shown in Fig. 3.

With the rod in this position upon the bracket of the holder, it will be seen, as shown in Fig. 1, that a portion of the rod, spaced from the handle thereof, is received within the bifurcation 22 so that the rod is securely supported upon the holder, being capable of being quickly and easily removed therefrom.

In order to facilitate the removal of the rod from the holder, a thumb rest 40 may be attached to the bracket 18, adjacent to the screw clip 25, so that when the handle 34 is grasped by the fingers the thumb may be pushed down upon the thumb rest 40 so as to easily remove the rod from the holder.

With this construction of holder, a fishing rod may be quickly and easily mounted thereon and removed therefrom and may be supported in any desired position relative to the boat seat, or other support, upon which the holder is mounted, since the clamping screw 15 permits the rod 14 to be adjusted vertically and rotated to any desired position, while the bracket 18 may be adjusted upon the rod 14 to hold the fishing rod in any desired inclination.

I claim:

1. A fishing rod holder including a substantially horizontal bracket, a spring clip attached to one end of the bracket and having downwardly disposed arcuate spring arms, a substantially C-shaped clip attached to the handle portions of the fishing rod and received between said spring arms of the spring clip, an upright at the other end of the bracket and a bifurcation upon said upright for receiving a portion of the fishing rod spaced from the handle.

2. A fishing rod holder including a substantially horizontal bracket, a spring clip attached to one end of the bracket and having downwardly disposed arcuate spring arms, a substantially C-shaped clip attached to the handle portions of the fishing rod and received between said spring arms of the spring clip, an upright stud upon the bracket located between the ends of said spring arms, there being an aperture in the lower end of said C-shaped clip for receiving said stud, an upright at the other end of the bracket and a bifurcation upon said upright for receiving a portion of the fishing rod spaced from the handle.

3. A holder for a fishing rod having a handle with an offset portion upon which a reel is mounted, said holder including a substantially horizontal bracket, a spring clip attached to one end of the bracket and having downwardly disposed arcuate spring arms, a substantially C-shaped clip having inturned flanges at its upper end engaged over the offset portion of the handle of the rod beneath the reel, said C-shaped clip being received between said spring arms of the spring clip, an upright at the other end of the bracket and a bifurcation upon said upright for receiving a portion of the fishing rod spaced from the handle.

4. A holder for a fishing rod having a handle with an offset portion upon which a reel is mounted, said holder including a substantially horizontal bracket, a spring clip attached to one end of the bracket and having downwardly disposed arcuate spring arms, a substantially C-shaped clip having inturned flanges at its upper end engaged over the offset portion of the handle of the rod beneath the reel, said C-shaped clip being received between said spring arms of the spring clip, an upright stud upon the bracket between the ends of said spring arms, there being an aperture in the lower end of said C-shaped clip for receiving said stud, an upright at the other end of the bracket and a bifurcation upon said upright for receiving a portion of the fishing rod spaced from the handle.

SAMUEL CLIMO.

REFERENCES CITED

The following references are of record in the file of this patent:

UNITED STATES PATENTS

| Number | Name | Date |
| --- | --- | --- |
| 635,612 | Tardel | Oct. 24, 1899 |
| 1,529,265 | Merckel | Mar. 10, 1925 |
| 2,238,127 | Nissen | Apr. 15, 1941 |

FOREIGN PATENTS

| Number | Country | Date |
| --- | --- | --- |
| 596,336 | France | Oct. 21, 1925 |